US010239445B1

(12) United States Patent
Hendricks

(10) Patent No.: US 10,239,445 B1
(45) Date of Patent: Mar. 26, 2019

(54) PROJECTION ASSEMBLY FOR A VEHICLE

(71) Applicant: Timothy W. Hendricks, Acworth, GA (US)

(72) Inventor: Timothy W. Hendricks, Acworth, GA (US)

( * ) Notice: Subject to any disclaimer, the term of this patent is extended or adjusted under 35 U.S.C. 154(b) by 0 days.

(21) Appl. No.: 15/882,171

(22) Filed: Jan. 29, 2018

Related U.S. Application Data

(60) Provisional application No. 62/451,731, filed on Jan. 29, 2017.

(51) Int. Cl.
| | |
|---|---|
| *B60Q 1/50* | (2006.01) |
| *B60Q 1/26* | (2006.01) |
| *B60Q 1/52* | (2006.01) |
| *G09F 21/04* | (2006.01) |

(52) U.S. Cl.
CPC ........... *B60Q 1/503* (2013.01); *B60Q 1/2615* (2013.01); *B60Q 1/52* (2013.01); *G09F 21/04* (2013.01)

(58) Field of Classification Search
CPC ........ B60Q 1/503; B60Q 1/2615; B60Q 1/52; G09F 21/04
See application file for complete search history.

(56) References Cited

U.S. PATENT DOCUMENTS

| | | | | | |
|---|---|---|---|---|---|
| 2,023,845 | A | * | 12/1935 | Larose | B60Q 1/2607 40/556 |
| 2,694,138 | A | * | 11/1954 | Schwinn | B62J 6/00 362/102 |
| 5,040,099 | A | * | 8/1991 | Harris | A42B 3/0453 362/105 |
| 5,072,339 | A | * | 12/1991 | Shimojo | B60Q 1/24 362/473 |
| 5,281,985 | A | * | 1/1994 | Chan | G09F 21/04 348/744 |
| 5,724,161 | A | * | 3/1998 | Smith | G02B 27/0103 349/34 |
| 6,120,167 | A | * | 9/2000 | Nace | B60Q 1/30 362/473 |
| 6,220,737 | B1 | * | 4/2001 | Baragona | B60Q 1/0483 362/339 |
| 6,724,538 | B2 | * | 4/2004 | Kushida | B62J 17/04 359/630 |
| 6,937,146 | B2 | * | 8/2005 | Tracy | A61H 3/061 340/464 |
| 7,021,708 | B2 | * | 4/2006 | Renner | B62J 1/12 280/288.4 |
| 7,175,321 | B1 | * | 2/2007 | Lopez | B60Q 1/50 296/21 |
| 7,397,355 | B2 | * | 7/2008 | Tracy | B60Q 1/442 340/467 |
| 7,871,188 | B1 | * | 1/2011 | Turby | B60Q 1/2607 362/473 |

(Continued)

*Primary Examiner* — Nay Tun
(74) *Attorney, Agent, or Firm* — Womble Bond Dickinson (US) LLP

(57) ABSTRACT

A safety projection assembly including a housing comprising top, bottom, front, rear, and side portions that at least partially surround and at least partially define a cavity, the bottom portion of the housing is connected to at least a portion of the vehicle; and a projection mechanism at least partially received within the cavity of the housing, the projection mechanism is configured to project an image or a series of images onto at least a portion of the vehicle or an operator thereof.

10 Claims, 12 Drawing Sheets

(56) References Cited

U.S. PATENT DOCUMENTS

| | | | | |
|---|---|---|---|---|
| 8,091,822 B2* | 1/2012 | Boyce | G09F 19/18 | |
| | | | 244/13 | |
| 8,325,027 B2* | 12/2012 | Tee | A42B 3/044 | |
| | | | 340/321 | |
| 8,651,664 B2* | 2/2014 | Harvey | G03B 21/145 | |
| | | | 244/117 R | |
| 8,733,939 B2* | 5/2014 | Othmer | B60Q 1/50 | |
| | | | 353/13 | |
| 9,341,307 B2* | 5/2016 | Seal | G09F 13/02 | |
| 9,656,602 B2* | 5/2017 | Needham | B60Q 1/32 | |
| 2003/0140536 A1* | 7/2003 | Bilyeu | G09F 21/04 | |
| | | | 40/574 | |
| 2005/0275193 A1* | 12/2005 | Lee | B60Q 1/2673 | |
| | | | 280/468 | |
| 2006/0143957 A1* | 7/2006 | Salehi | G09F 19/18 | |
| | | | 40/590 | |
| 2008/0239080 A1* | 10/2008 | Moscato | A42B 3/0426 | |
| | | | 348/148 | |
| 2008/0284983 A1* | 11/2008 | Dula | G03B 29/00 | |
| | | | 352/131 | |
| 2010/0283590 A1* | 11/2010 | Tee | A42B 3/044 | |
| | | | 340/432 | |
| 2011/0032484 A1* | 2/2011 | Seal | G03B 21/30 | |
| | | | 353/13 | |
| 2014/0070963 A1* | 3/2014 | DeLorean | G06Q 30/0241 | |
| | | | 340/917 | |
| 2015/0032328 A1* | 1/2015 | Healey | B60Q 1/503 | |
| | | | 701/36 | |
| 2015/0108299 A1* | 4/2015 | Seal | F16M 13/022 | |
| | | | 248/205.1 | |
| 2016/0031366 A1* | 2/2016 | White | B60Q 1/503 | |
| | | | 353/13 | |
| 2016/0257263 A1* | 9/2016 | Seal | F16M 13/022 | |
| 2017/0200197 A1* | 7/2017 | Brubaker | G06Q 30/0266 | |

* cited by examiner

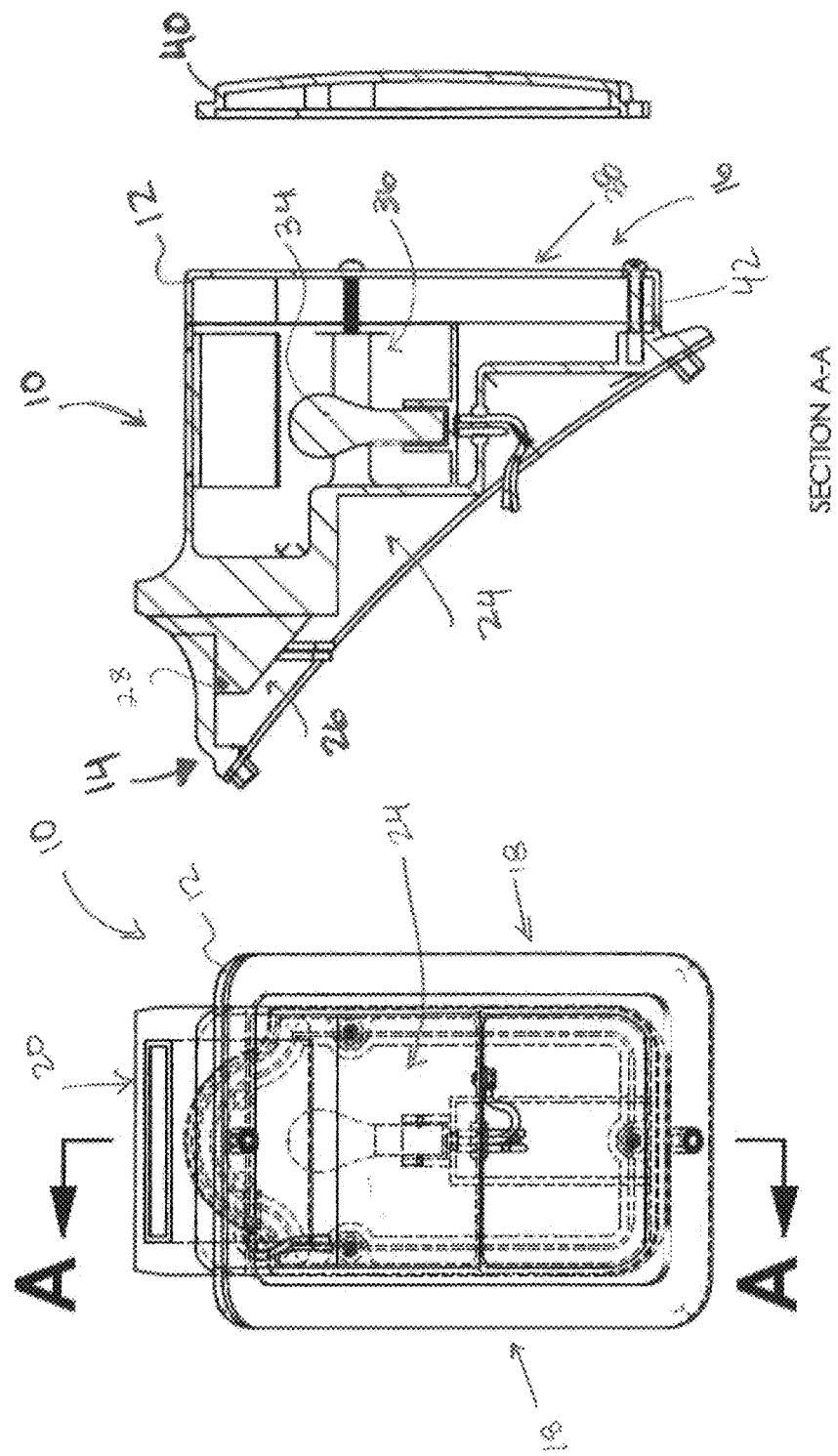

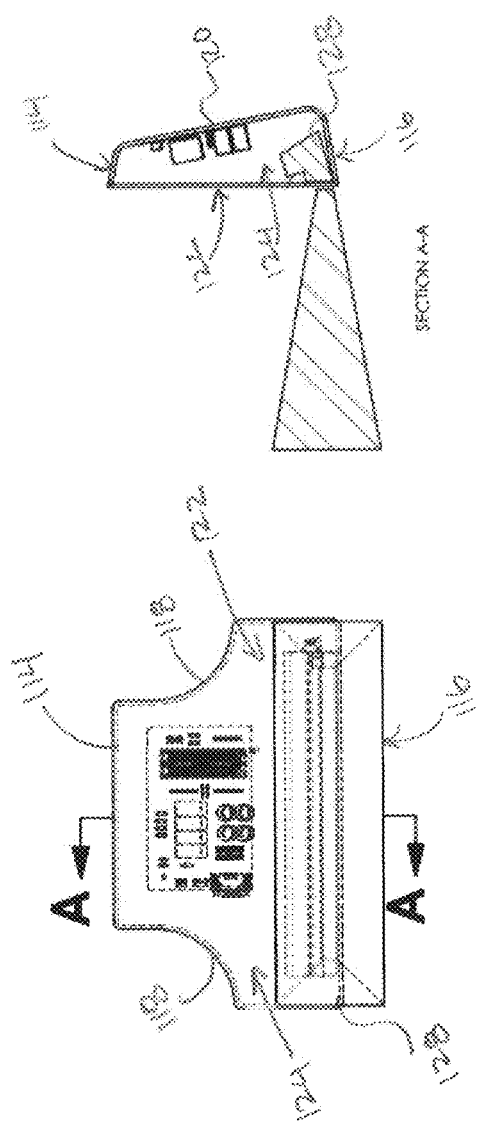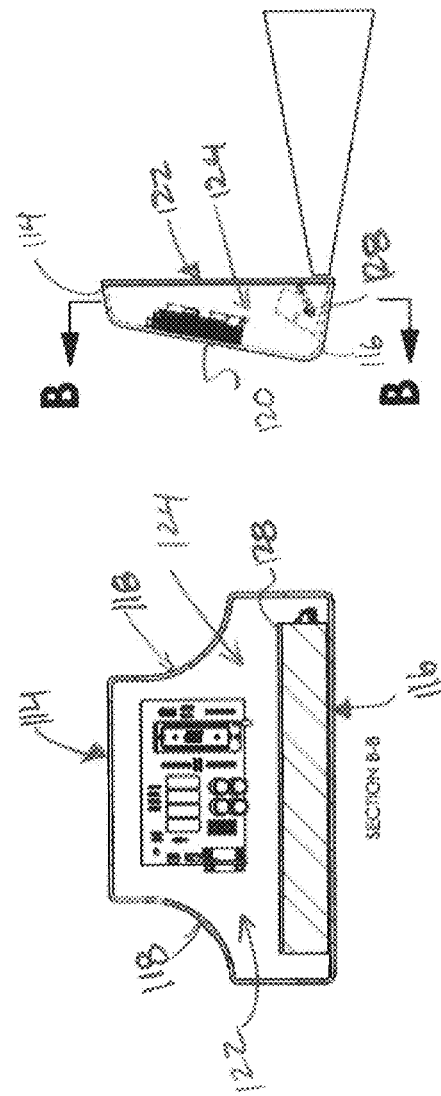
FIG. 5A
FIG 5B

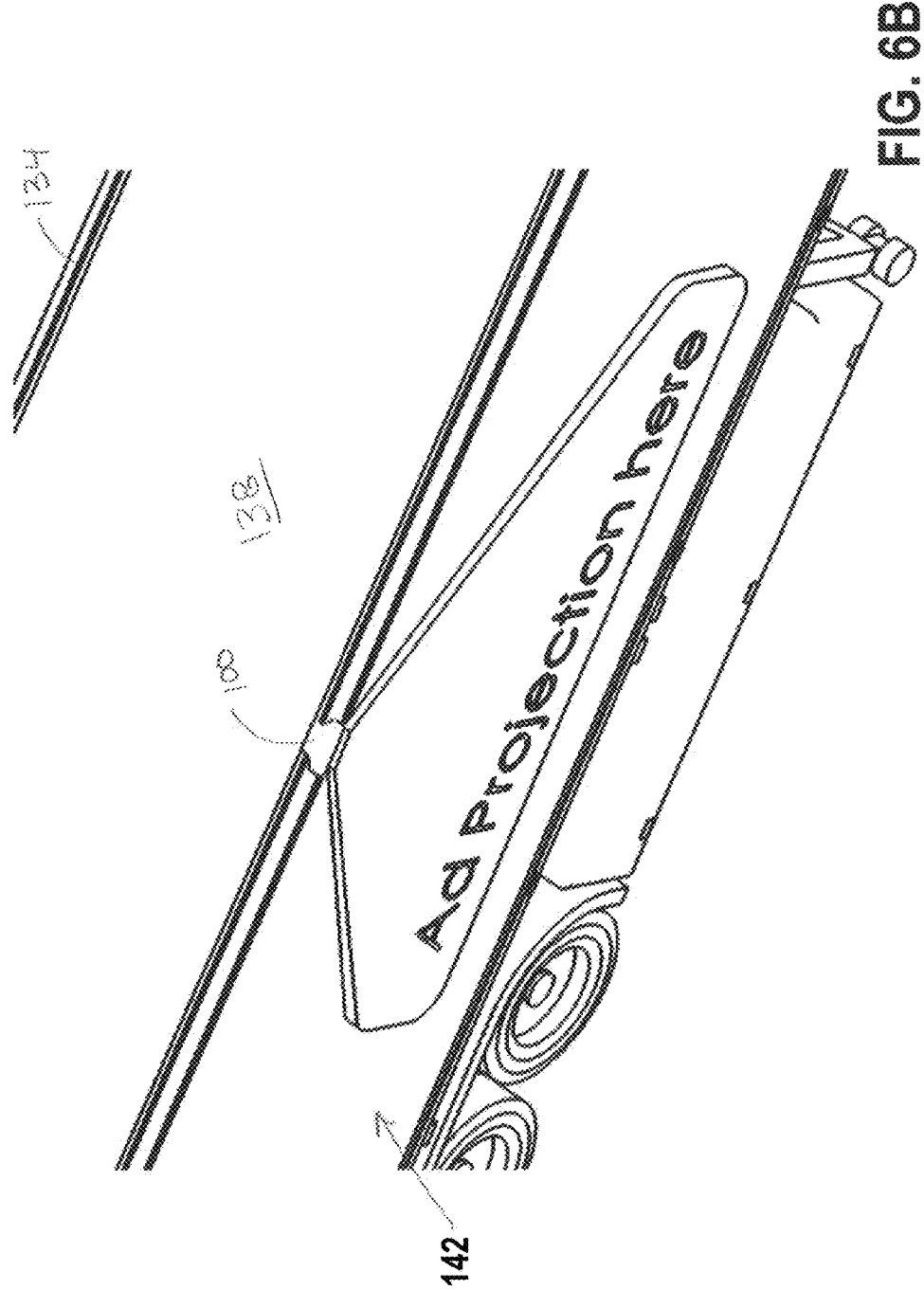

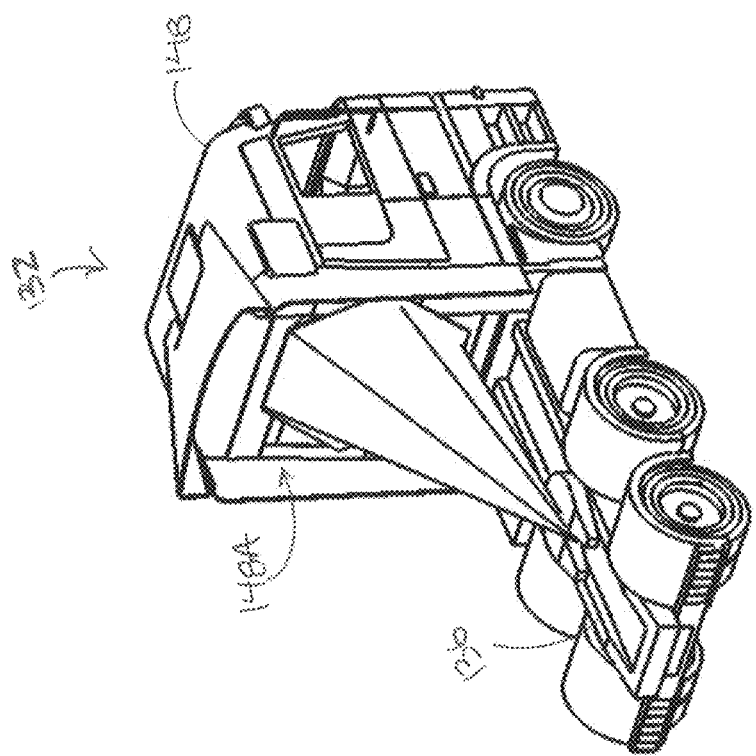
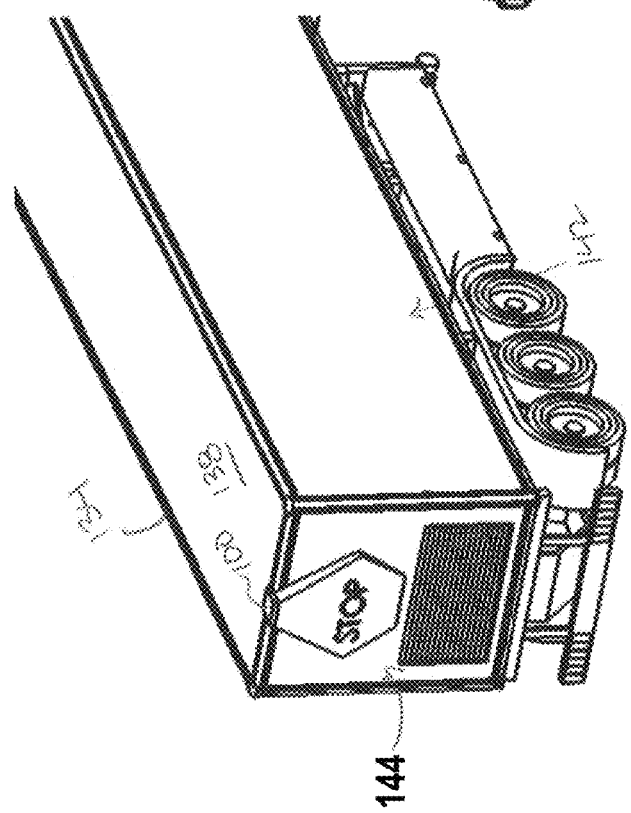
FIG. 6C
FIG. 6D

PROJECTION ASSEMBLY FOR A VEHICLE

CROSS-REFERENCE TO RELATED APPLICATIONS

The present Patent Application claims the benefit of United States Provisional Patent Application No. 62/451,731 filed Jan. 29, 2017.

INCORPORATION BY REFERENCE

The disclosure of U.S. Provisional Patent Application No. 62/451,731 filed Jan. 29, 2017, is hereby incorporated by reference as if presented herein in its entirety.

TECHNICAL FIELD

The present disclosure is directed to a projection assembly for a vehicle, such as motorized and/or non-motorized vehicles including motorcycles, bicycles, cars, trucks, SUVs, box trucks, 18 wheelers, tankers, vans, cars-in-tow, forklifts, trailers, recreational vehicles, bicycles, scooters, hoverboards, dirigibles, aerial drones, etc.

BACKGROUND

Motor vehicle accidents are believed to account for up to 40,000 deaths per year in the U.S. It further is commonly understood that large trucks (e.g., semis) and motorcycles are especially dangerous. For example, it is estimated that, on U.S. highways, a motorcycle is rear ended on average about every 17 seconds. Further, approximately 500,000 trucking accidents occur per year, with about 5,000 of the trucking accidents resulting in facilities, which usually include occupants of smaller vehicles involved in the accident. One contributor to this problem seems to be that current visibility of indicia of vehicle operations, for example, brake lights and turn signals, is very limited due to the lack of surface area that current light systems possess. Accordingly, Applicant has discovered that a need exists to increase the visibility of braking and turn signals to maximize visibility and awareness. The following disclosure was developed to address the foregoing and other related and unrelated problems in the art.

SUMMARY

In general, the present disclosure is directed to a projection assembly for a vehicle, such as, a motorcycle, a bicycle, a car, a truck, a van, an SUV, box trucks, 18 wheelers, tanker trucks, cars in tow, forklift, tractors, trailers, recreational vehicles (e.g., dirt bikes, ATVs, etc.), or other suitable motorized and non-motorized vehicles. The projection assembly is operable to project light, such as an image or series or sequence of images onto, or otherwise illuminate, at least a portion of the vehicle or a rider (e.g., driver or passenger) thereof.

The projection assembly can include a projection mechanism such as a high-strength projector that is configured to project an image or a series of images in standard definition, high definition, for example, 720p, 1080i, 1080p, 1440p, 2000p, 2160p (e.g., 4K UHD), 2540p, 4000p, 4320p (e.g., 8K UHD), etc., onto at least a portion of the vehicle or a rider thereof. The images can include generally static images or pulsing flash images, including text, pictures, or other indicia, and or sequences of images, such as slide shows, animations, videos, etc.

The projection assembly can include a housing configured to be attached to the vehicle, which housing can include a body having top, bottom, front, rear, and side portions that at least partially surround and at least partially define a cavity or chamber. The projection assembly can be at least partially received within the cavity or chamber of the housing.

The housing further may have one or more slots, openings, or other suitable apertures, defined therealong, and the projection mechanism can be positioned within the housing substantially adjacent or substantially proximate to the slot(s) or opening(s) so that light generated thereby can pass through the slot(s) or opening(s) and be directed onto a selected portion of the vehicle or rider or operator thereof.

The projection assembly can be operable to project one or more images onto at least a portion of the vehicle or rider (e.g., driver or passenger) thereof that generally correspond to one or more vehicle operations, such as activation of the brakes, turn signals, emergency flashers, etc.

The projection assembly further can project one or more images or sequence thereof that include an advertisement or other message, such as an Amber® Alert, FEMA® Emergency Alert System notifications, or other Public Service Announcements (PSAs). The projection assembly can project any suitable images, however, such as one or more images, videos, animations, etc. selected by a user, e.g., images corresponding to a user's biker club, business, etc.

The projection assembly additionally can include a GPS unit, or other locating device, that is operable to determine a location of the vehicle. The projection assembly further can project one or more images or sequences thereof based upon the determined location of the vehicle. For example, the projection assembly can display advertisements or messages that may change based upon the determined location of the vehicle.

The projection assembly also may include one or more sensing devices, such as an ambient light sensor operable to detect light ambient light conditions. The projection assembly accordingly can adjust the intensity (e.g., the brightness) or other aspect of the light projected therefrom based upon determined light conditions. For example, the intensity may be increased in high light conditions (e.g., day time) to, for example, improve visibility (such as through contrast), and may be decreased in low light conditions (e.g., night time) to, for example, conserve power.

The projection assembly further can include one or more motion sensors, such as an accelerometer or other suitable device, to detect movements of the vehicle, such as accelerations, decelerations, side to side movements, etc. The projection assembly can project one or more images or a sequence thereof based upon detected movements of the vehicle. For example, if the motion sensor detects that the vehicle is slowing down (decelerating), the projection assembly may project an image(s) indicating that the vehicle is coming to a stop, and if the motion sensor detects lateral or side to side movements the projection assembly may project an image that indicates that the vehicle is turning or attempting to turn.

The GPS unit and the motion sensor further can be used to track and log the vehicle's time in motion, for example, for compliance with governmental or regulatory requirements.

The GPS unit and/or other sources such as a transmitter/receiver can also provide one or more images or a sequence of images relating to navigation (such as upcoming turns or relative distances), roadway information, weather, or other travel information.

In one aspect of the present disclosure, the projection assembly can be configured to be connected to a motorcycle or other two-wheel vehicle, such as a moped, scooter, dirt bike, mini-bike, bicycle, etc., or other ridden or recreational vehicle, such as an ATV, three-wheeler, etc. In one embodiment, the bottom portion of the housing can be configured to facilitate connection of the projection assembly to a rear fender of the motorcycle. For example, the bottom portion of the housing may comprise an arcuate shape that is generally complementary to an upper surface of the rear fender of the motorcycle to facilitate attachment of the projection assembly thereto. The bottom portion of the housing also can include, or be coupled to, one or more magnets or magnetized portions that facilitate a releasable connection between the projection assembly and the rear fender of the motor cycle. The projection assembly can have any suitable attachment features, however, without departing from the scope of the present disclosure. For example, the projection assembly can be attached to the fender or other part of the motorcycle by an adhesive or one or more fasteners or, in the alternative, the projection assembly can be integrally formed with the fender or other part of the motorcycle. In another example, the projection assembly can be reconfigurable to accommodate different fenders or other parts of different vehicles. In still another example, the projection assembly can include one or more modular portions that can be replaced to accommodate different fenders or other parts of different vehicles.

Additionally, the projection assembly can be integrated with, and/or operate as, the brake light assembly for the motorcycle. For example, a light source, such as one or more LEDs, lightbulbs, lamps, or other suitable light source, can be received within the cavity of the housing. The light source further can be communicatively coupled to the brakes, or other component of the motorcycle, e.g., turn signal, emergency flashers, etc., such that when the brakes, or other component(s), are activated, the light source is illuminated. The rear portion of the housing further can include an at least partially translucent material, such as an at least partially translucent material having a red tint or other coloring that lights up or otherwise illuminates when the light source is activated, i.e., to indicate that the brakes of the vehicle are activated.

The projection assembly further can be designed to project light upon, e.g., an image or sequence of images, or otherwise illuminate, a rider's back or other portion or part at the rear of the motorcycle, for example, seat, backrest, saddle bag, sidecar, etc., when the turn signals or brakes are applied. Projected light from the projection mechanism can pulse or stay constant. The projected light further can include one or more images or sequence thereof, such as display signs or text in different colors using the high intensity projection lighting from the projection mechanism. As a result, visibility of the motorcycle or other vehicle is increased, for example, for motorists following behind or in close proximity thereof, so as to maximize other drivers' awareness of the motorcycle. For example, the projected images can multiply, e.g., double, triple, quadruple, or more the surface area of the displayed vehicle operation in comparison to current notification mechanisms (e.g., current turn signals or brake light systems). The projected lighting can also be adjusted in brightness, size, shape angle, text display or even be disabled in various conditions. The projector can be configured to display any suitable images, however, such as advertisements, messages, or other notification, such as emergency notifications including Amber® Alerts, Emergency Alert System notifications, or other Public Service Announcements (PSAs).

In another aspect of the present disclosure, the projection assembly can be configured to be attached to at least a portion of a truck or semi-truck (e.g., big-rig, tractor-trailer, semi-trailer, 18 wheeler, etc.). In one embodiment, the bottom portion of the projection assembly can be configured to be attached to a portion of a trailer towed by a semi-tractor. In addition, or in the alternative, the projection assembly can be configured to be mounted to at least a portion of the semi-tractor, such as its fifth wheel hitch when a trailer is not attached. In one example, the bottom portion of the housing of the projection assembly can be configured to be coupled to the roof or other upper portion of a trailer. The bottom portion of the housing can include or be coupled to one or more magnets or magnetized portions that allow for releasable attachment of the projection assembly, though the projection assembly can include any suitable attachment feature, such as one or more fasteners or an adhesive, or can be integrally formed with a portion of the trailer or semi-tractor, without departing from the scope of the present disclosure. In other examples, the projection assembly can be reconfigurable or have one or more modular portions to accommodate different vehicles.

The projection assembly further can include one or more slots formed along the bottom portion of the housing, and the projection mechanism may be positioned substantially proximate or substantially adjacent to one or more slots, openings, or apertures such that light generated thereby can be directed onto a rear or side portion of the trailer. In addition, or in the alternative, the slot(s) can be formed along a top portion of the housing to allow light generated from the projector to be directed onto a rear portion of the cab of the semi-tractor.

Those skilled in the art will appreciate the above stated advantages and other advantages and benefits of various additional embodiments when reading the following detailed description of the embodiments with reference to the below-listed drawing figures. Additionally, those skilled in the art will understand that the disclosure shows and describes only selected embodiments and is capable of use in various other combinations, modifications, and environments. The above described aspects of the present disclosure further are capable of changes or modifications within the scope of the inventive concept as expressed herein, commensurate with the above teachings, and/or within the skill or knowledge of the relevant art, and certain features and characteristics of each embodiment may be selectively interchanged and applied to other illustrated and non-illustrated embodiments of the disclosure.

BRIEF DESCRIPTION OF THE DRAWINGS

The accompanying drawings, which are included to provide a further understanding of the features of this disclosure, are incorporated in and constitute a part of this specification, illustrate embodiments of this disclosure, and together with the detailed description, serve to explain the principles of this disclosure. No attempt is made to show structural details of the embodiments in more detail than may be necessary for a fundamental understanding of the embodiments and the various ways in which the embodiments may be practiced. In addition, it will be understood by those skilled in the art that the invention and the various features thereof discussed below are explained in detail with reference to non-limiting embodiments and examples that are described and/or illustrated in the accompanying drawings. It should be noted that the features illustrated in the drawings are not necessarily drawn to scale, and features of one embodiment may be employed with other embodiments as the skilled artisan would recognize, even if not explicitly stated herein. Descriptions of certain components and processing techniques further may be omitted so as to not unnecessarily obscure the embodiments of this disclosure.

FIGS. 2A and 2B show phantom and cross-sectional views of the projection assembly of FIGS. 1A and 1B.

FIGS. 5A and 5B show partial cross-sectional views of the projection assembly of FIG. 4.

FIGS. 6A-6D show perspective views of the projection assembly of FIGS. 4, 5A, and 5B coupled to a semi-truck.

DETAILED DESCRIPTION

As generally shown in FIGS. 1A-9C, the present disclosure provides a projection assembly 10/100 for a vehicle, such as a motorcycle, mini-bike, dirt bike, moped, scooter, hoverboard, bicycle, car, truck, sport utility vehicle ("SUV"), van, commercial van, semi-truck (e.g., big-rig, tractor-trailer, 18 wheeler, etc.), semi-trailer, tractor trailer, tractor, recreational vehicle (e.g., ATV, golf cart, go cart, etc.), or other suitable motorized and non-motorized vehicles.

Figure 1A:
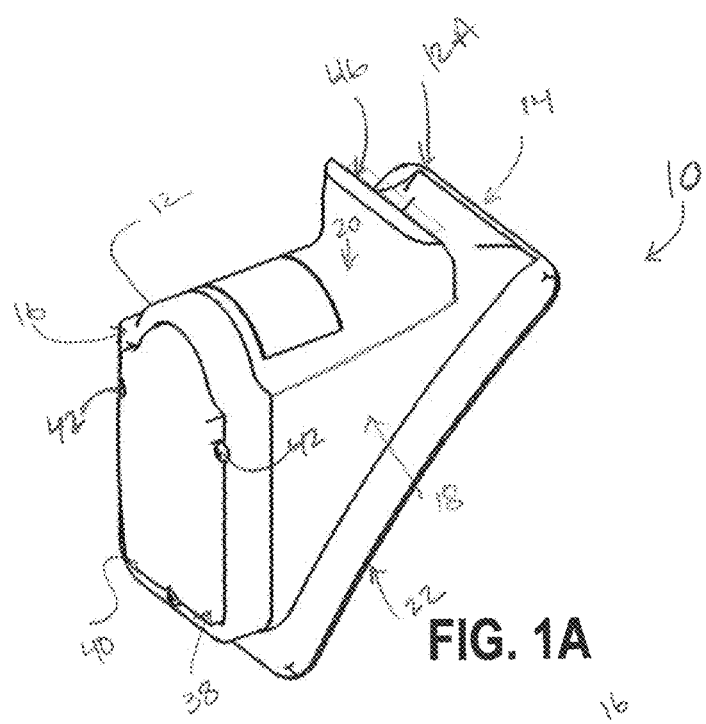
FIGS. 1A and 1B show perspective views of a projection assembly for a vehicle according to one aspect of the present disclosure.
Figure 1B:
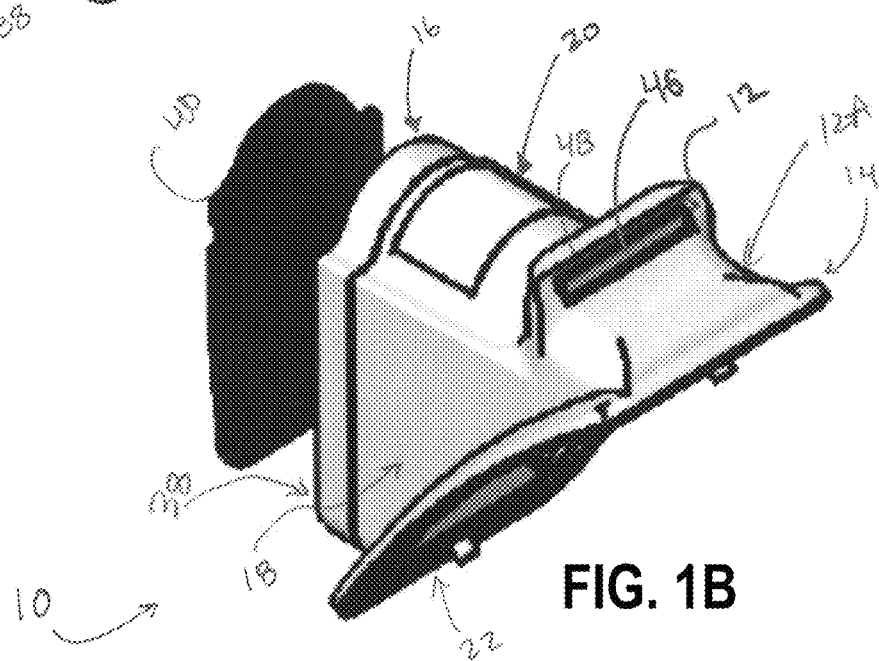

FIGS. 1A and 1B show perspective views of the projection assembly according to one aspect of the present disclosure, while FIGS. 2A and 2B show cross-sectional views of the projection assembly of FIGS. 1A and 1B. As shown in FIGS. 1A-1B and 2A-2B, the projection assembly 10 generally will include a housing or other body (or bodies) 12 having forward 14, rear 16, side 18, top 20 and bottom 22 sections or portions that at least partially define a cavity or chamber 24. The cavity or chamber 24 generally is constructed to have one or more compartments 26 generally sized, dimensioned, or otherwise configured to at least partially receive a projection mechanism 28 or other suitable light emitting devices for projecting one or more images. In one embodiment, one or more portions of the housing 12 can be at least partially removable, for example, to provide access to the cavity or chamber 24 or to other interior portions of the projection assembly 10. The housing 12 can be formed from a plastic or other polymeric material, though the housing 12 can be formed from any suitable materials or combination thereof, such as metals, composites, etc. In one embodiment, the projection mechanism 28 includes a high-strength projector positioned along the forward portion 14 of the housing 12. The projection mechanism 28 can include a lamp or laser projector configured to project standard definition, high-definition, 4K, 8K, etc., images or videos onto at least a portion of the vehicle or rider thereof. The projection mechanism 28 can include any suitable projector or projection device that is capable of projecting images onto, or otherwise illuminating, at least a portion of the vehicle or rider thereof, however, without departing from the scope of the present disclosure.

Figure 3:
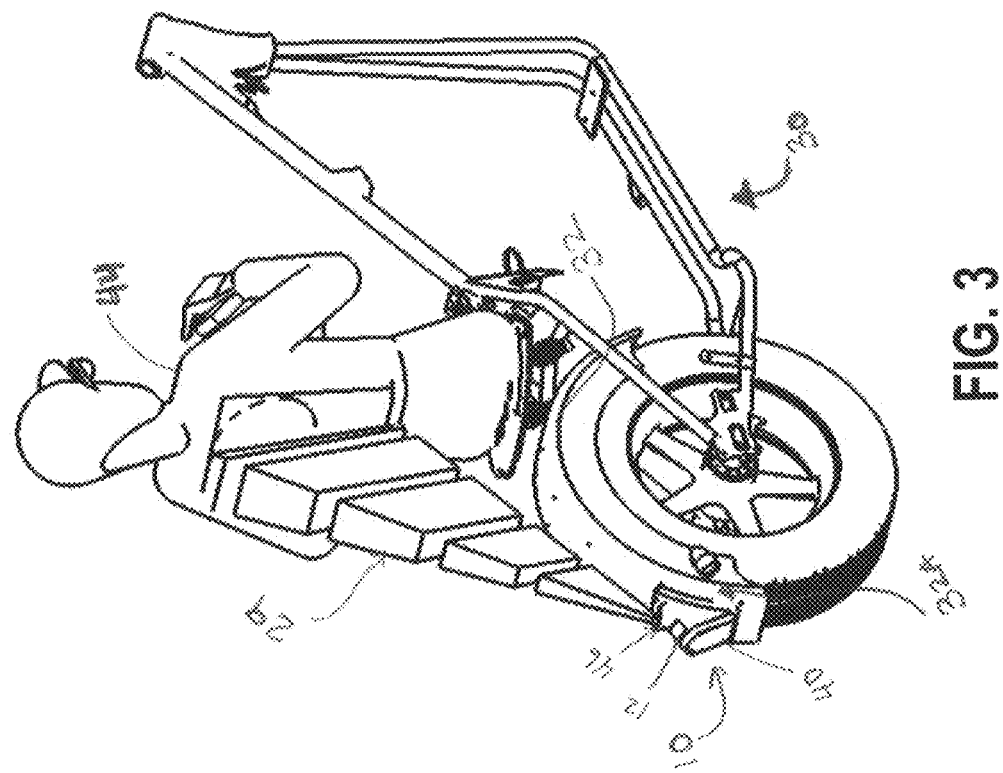
FIG. 3 shows a perspective view of the projection assembly of FIGS. 1A-1B and 2A-2B coupled to the rear fender of a motorcycle.

According to principles of the present disclosure, the vehicle projection assembly 10 can be configured to be connected to a motorcycle 30 or other two-wheel vehicle, such as a moped, scooter, dirt bike, mini-bike, bicycle, etc., or other ridden recreational vehicles, such as ATVs, three-wheelers, go-carts, hoverboards, ultra-lights, etc. FIG. 3 shows one example wherein the projection assembly 12 is connected to a motorcycle 30. As shown in FIG. 3, the bottom portion 22 of the housing 12 can be generally configured to facilitate connection of the projection assembly 10 to a rear fender 32 of the motorcycle 30. For example, the bottom portion 22 of the housing 12 may comprise a generally curved or arcuate shape that is generally complementary to an upper surface 32A of the rear fender 32 of the motorcycle 30 to facilitate attachment of the projection assembly 10 thereto. However, the bottom portion 22 of the housing 12, or other portions of the housing 12, can have any suitable shape, dimension, or configuration, so as to be configured to be coupled or otherwise fixed to any suitable portion of the motorcycle 30 or other vehicle, without departing from the scope of the present disclosure. In one embodiment, the housing 12 can be at least partially reconfigurable to at least partially conform to a portion of the motorcycle 30 or other vehicle, for example, the bottom portion 22 of the housing 12 can include one or more flexible or otherwise repositionable portions to accommodate surfaces of different shapes and sizes. In another embodiment, one or more portions of the housing 12 can be modular, e.g., replaceable, such that different modular portions of the housing 12 can be provided for surfaces of different shapes and sizes.

The bottom portion 22 of the housing 12 also can include, or be coupled to, one or more magnets or magnetized portions that facilitate a releasable connection between the projection assembly 10 and the rear fender 32 of the motorcycle 30 (not shown). The projection assembly 10 can have any suitable attachment features, however, without departing from the scope of the present disclosure. For example, the projection assembly 10 can be attached to the fender or other part of the motorcycle by an adhesive, such as a releasable adhesive, or one or more fasteners (e.g., screws, bolts, rivets, etc.) or, in the alternative, the projection assembly 10 can be integrally formed with the fender 32 or other part of the motorcycle 30 or other vehicle. In another example, the projection assembly 10 can be mounted to an existing or pre-formed mount associated with the motorcycle 10, for example a mount for a brake light. Additionally, in some embodiments of the present disclosure, the projection assembly 10 can include a plurality of interchangeable, modular bottom portions (or other portions) with various constructions, configurations, etc. that facilitate attachment of the projection assembly 10 to different fenders, mounts, etc.

Returning to FIGS. 1A-1B and FIGS. 2A-2B, the projection assembly 10 further can be integrated with, and/or operate as, the brake light assembly for the motorcycle 30 or other vehicle. For example, a light source 34, such as one or more LEDs, lightbulbs, lamps, or other suitable light source, can be received within a compartment 36 of the cavity 24 of the housing 12. The light source 34 further can be communicatively coupled to the brakes, or other component of the motorcycle 30, e.g., turn signal, emergency flashers, etc., such that when the brakes, or other component(s), are activated, the light source 34 is illuminated or otherwise activated. The rear portion 16 of the housing 12 further can include an at least partially translucent section or portion, such as a section or portion made from an at least partially translucent material, for example, having a red tint or coloring, or other suitable tint/coloring such as green, white, yellow, etc., that lights up or otherwise illuminates when the light source 34 is activated. In one embodiment, the rear portion 16 of the housing 12 can have an opening or aperture 38 defined therein and a tail light lens 40 configured to be secured to the housing 12, for example, by one or more fasteners, e.g., screws 42, bolts, or other suitable fasteners or fixing mechanism (snap fitting, etc.), at position to at least partially cover the opening 38, such that the lens 40 is illuminated by the light source 34.

FIG. 3 further shows that the projection assembly 10 can be designed to project light 29 upon, e.g., project an image or sequence of images, or otherwise illuminate, upon the back, or another portion, of a rider 44 when the turn signals or brakes are applied, though the projection assembly 10 can project images onto or otherwise illuminate other portions or parts of the motorcycle 30, for example, seat, backrest, saddle bag, sidecar, etc., without departing from the present disclosure. In one embodiment, a slot or opening 46 can be defined in the housing 12, for example, at a position substantially adjacent or substantially proximate to a forward end 12A of the housing 12, and a transparent material 48 further can be received along the slot 46 to allow for light from the projection mechanism 28 to pass therethrough and be directed to reflect off at least part of the motorcycle 30 or rider 44 thereof.

According to principles of the present disclosure, the projected/directed light 29 from the projection mechanism 28 can pulse or stay constant. The projected light 29 further can include one or more images or sequence thereof, such as display signs or text in different colors using the high intensity projection lighting from the projection mechanism 28. The projected images further can include videos, animations, or other suitable illuminations. The projected images can correspond to one or more vehicle operations, such as activation of the brakes, turn signals, emergency flashers, reverse, etc. Additionally, the projected images can include various information, such as advertisements, messages, or other notifications, e.g., emergency notifications including Amber® Alerts, Emergency Alert System notifications, or other Public Service Announcements (PSAs), navigation information, roadway information, and/or any other suitable information without departing from the scope of the present disclosure. As a result, visibility of the motorcycle 30 can be increased such that motorists following behind or in close proximity generally have increased awareness of the motorcycle 30. For example, the projected images or sequences thereof can more than multiply, e.g., double, triple, quadruple, or more the surface area of displayed vehicle operations in comparison to current notification mechanisms (e.g., brake lights, turn signals, emergency flashers, etc.). The projected light 29 can also be adjusted in brightness, size, shape angle, text display or even be disabled upon various conditions, for example, high or low light conditions.

Figure 4:
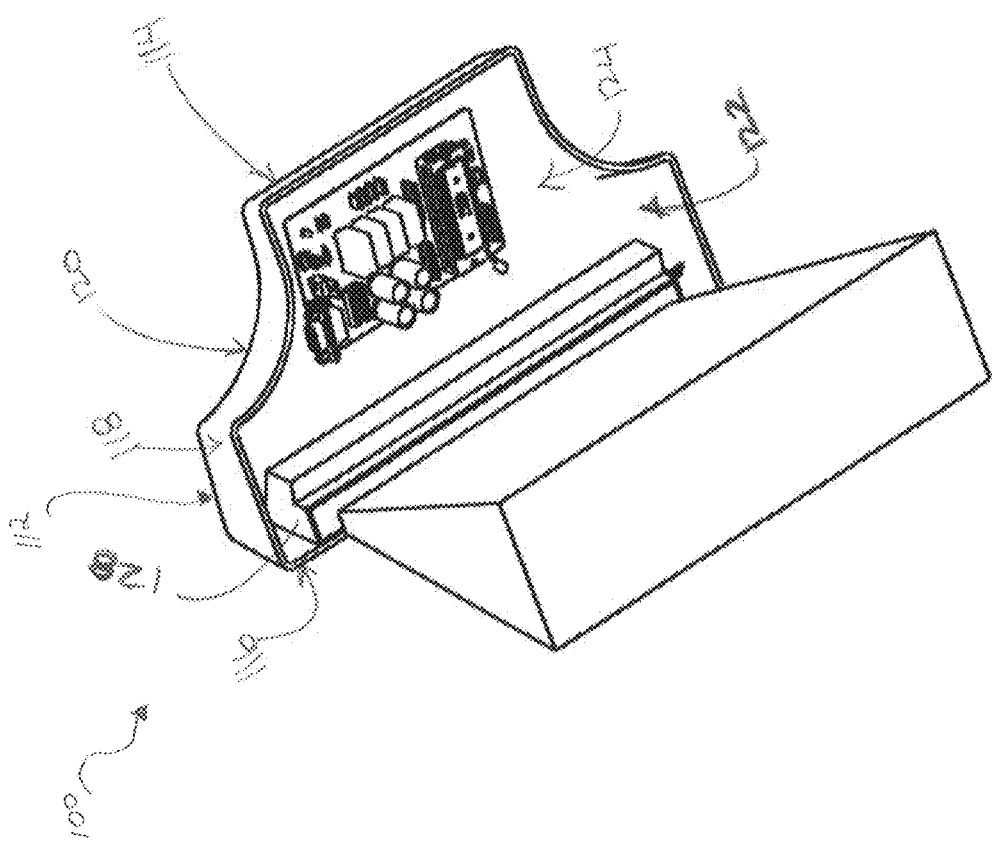
FIG. 4 shows a perspective view of the vehicle projection assembly according to an additional aspect of the present disclosure.

FIG. 4 shows a projection assembly 100 according to another aspect of the present disclosure, and FIGS. 5A and 5B show cross-sectional views of the projection assembly 100 of FIG. 4. As shown in FIGS. 4, 5A and 5B, the projection assembly 100 can include a housing or body (or bodies) 112 that have a front portion or section 114, a rear portion or section 116, a side portion or section 118, a top portion or section 120, and bottom portion or section 122. The housing 112 further has a cavity or chamber 124 that is at least partially defined by the front portion 114, the rear portion 116, the side portion 118, the top portion 120, and the bottom portion 120. Similar to the housing 12, the housing 112 can be formed from a plastic or other polymeric material, though other suitable materials, e.g., metallic materials, composites, etc., can be used without departing from the scope of the present disclosure. Additionally, a projection mechanism 128, which can include a high-intensity projector similar to, or substantially the same as, the projection mechanism 28 and/or any other suitable projection mechanism, can be at least received partially within the cavity 124.

Figure 6A:
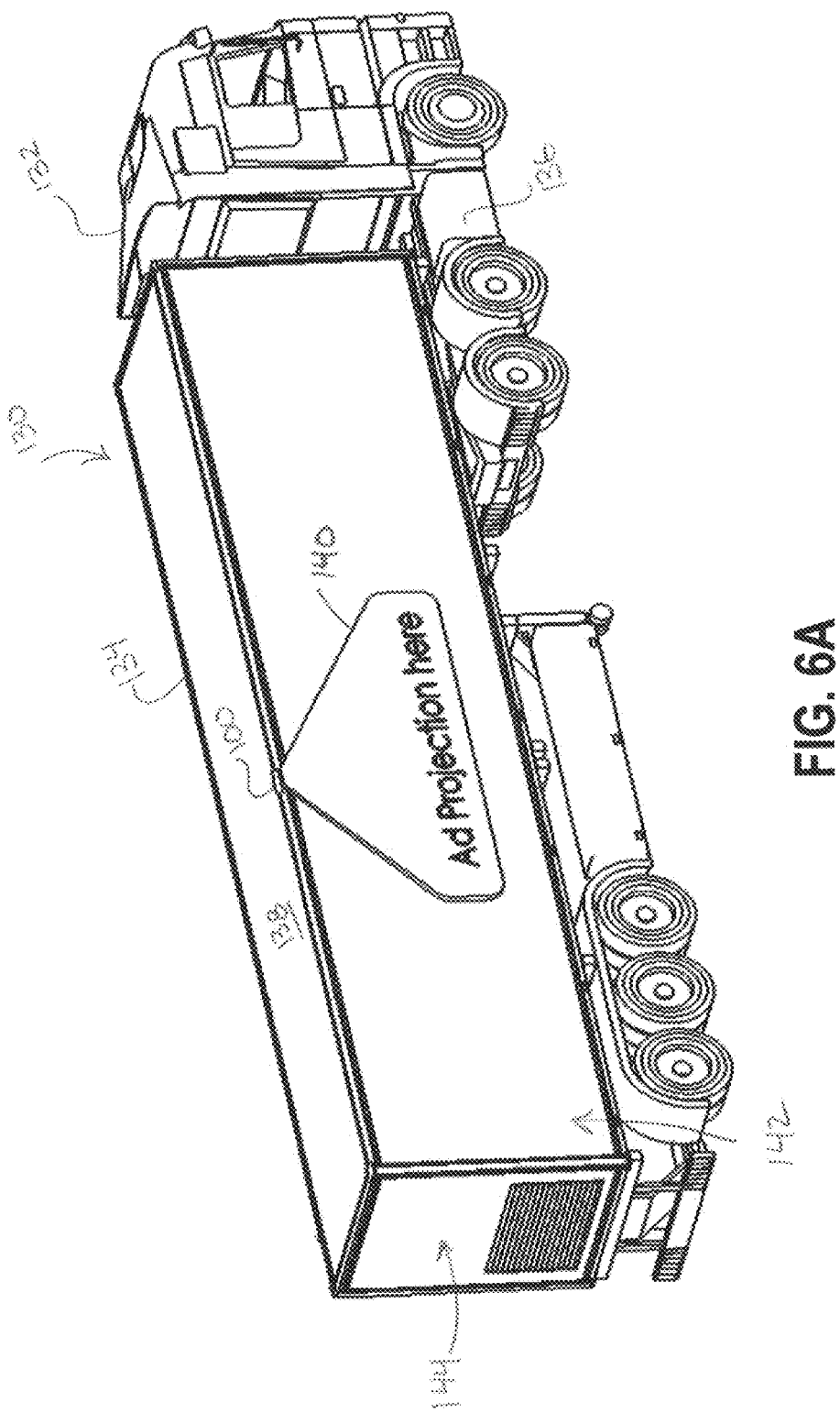

FIGS. 6A-6B show the projection assembly 100 can be attached to at least a portion of a semi-truck 130 having a truck/tractor 132 and trailer 134 configured to be towed by the truck/tractor 132 (e.g., big-rig, tractor-trailer, 18 wheeler, etc.). In one embodiment, as shown in FIGS. 6A-6B, the bottom portion 122 of the projection assembly 100 can be configured to be attached to at least a portion of the trailer 134. In addition, or in the alternative, the projection assembly 100 can be configured to be mounted to at least a portion of the semi-tractor/truck 132, such as its fifth wheel hitch 136 when a trailer 134 is not attached thereto. In one embodiment, as shown in FIGS. 6A-6C, the bottom portion 122 of the housing 112 of the projection assembly 100 can be configured to be coupled to the roof 138 or other upper portion of trailer 134. In addition, the bottom portion 122 of the housing 112 can include or be coupled to one or more magnets or magnetized portions (not shown) that allow for releasable attachment of the projection assembly 110, though the projection assembly 110 can include any suitable attachment features, such as one or more fasteners or an adhesive, or can be integrally formed with a portion of the trailer 134 or semi-tractor 132, without departing from the scope of the present disclosure. In one embodiment, the housing 12 can be at least partially reconfigurable or have one or more modular portions to at least partially conform to a portions of trailers and/or semi-tractors of different shapes and/or sizes.

FIGS. 6A-6C show that the projection assembly 100 can be positioned along the roof 138 of the trailer 134, such that the projection mechanism 128 projects light 140 (e.g., one or more images or sequence thereof) onto at least a portion of a side 142 (FIGS. 6A-6B) of the trailer 134 or at least a portion of the rear 144 (FIG. 6C) of the trailer 134. The projection assembly 100 can include one or more slots, openings, or other apertures 146 formed along the bottom portion 122 of the housing 112 substantially adjacent to a rear end 112B thereof such that light generated by the projection mechanism 128 can be directed onto a rear 144 or side 142 portion of the trailer 134. In addition, or in the alternative, one or more slots, openings, apertures, etc. can be formed along the top portion 120 of the housing 120 to allow light generated from the projection mechanism 128 to be direct onto a rear portion 148A of the cab 148 of the truck/tractor 132.

Figure 7:
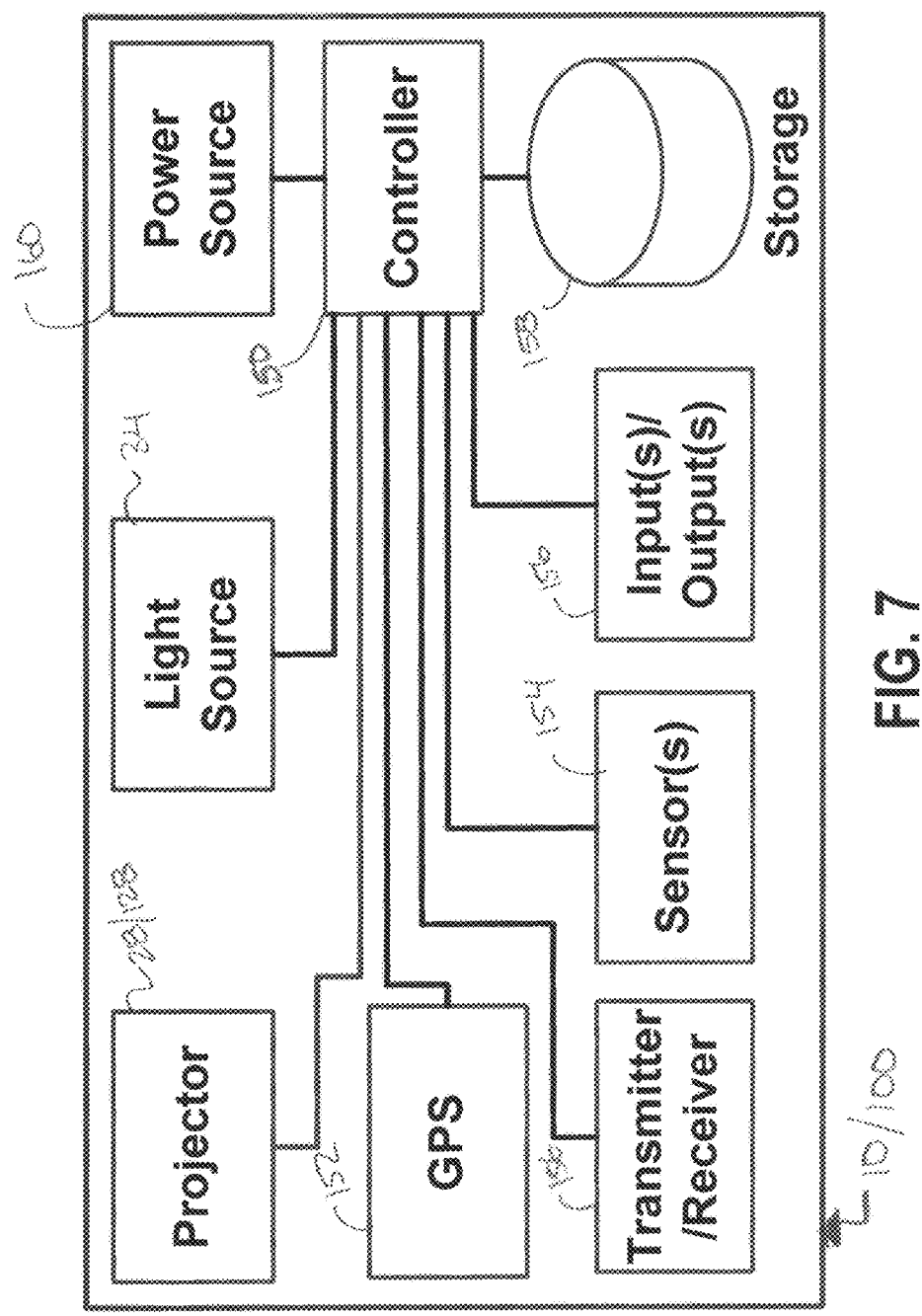
FIG. 7 shows a block diagram of exemplary components of a vehicle projection assembly according to principles of the present disclosure.

FIG. 7 shows a schematic view of various example control components that can be included with the vehicle projection assemblies 10/100. As shown in FIG. 7, the projection assembly 10/100 can include a controller 150 that is communicatively coupled with the projection mechanism 28/128 and is operable to control one or more operations thereof. The controller 150 can include any suitable control circuitry, processor, CPU, or control device, without departing from the scope of the present disclosure. FIG. 7 further shows that the projection assemblies 10/100 can include or be in communication with a global positioning system (GPS) unit 152, one or more sensors 154, a transmitter and/or receiver 156, one or more inputs or outputs 156, and/or a storage 158. The projection assemblies 10/100 further can include a power source 160 to provide power to various components thereof. The storage 158 can include any suitable storage media, e.g., ROM, or other non-volatile memory, and the inputs/outputs 156 can include any suitable input/output ports, such as USB ports, micro USB ports, FireWire ports, SD card ports, etc., to allow for communication with one or more mobile devices, storage devices (SD cards, flash drives, etc.) or other suitable devices.

The one or more sensors 154 can include any suitable sensors or sensing devices, such as accelerometers, ambient light sensors, pressure sensors, proximity sensors, cameras, impact sensors, radar sensors, LiDar sensors, etc. The one or more sensors 154 can also include weather or environment sensors, for example, temperature or heat sensors, humidity sensors, altimeters or other altitude sensors, etc. In one example, the one or more sensors 154 can provide weather information for display as one or more images or series of images by the projection mechanism 28/128. Such information can be tracked or updated during travel by the vehicle. In another example embodiment, the one or more sensors 154 can include at least one accelerometer that is operable to detect movements of the vehicle (e.g., accelerations, decelerations, side-to-side movements, etc.). Upon activation or detection of movement by the accelerometer, the controller 150 can turn on or off the projection assembly 10/110 or cause the projection assembly 10/110 to enter a stand-by mode. The controller 150 further can control the projection mechanism 28/128 to display one or more images or sequence thereof based on the detected movements of the vehicle. For example, if the accelerometer detects that the vehicle is decelerating or rapidly slowing down, the controller 150 can control the projection mechanism 28/128 to display one or more images or sequence thereof indicating that the vehicle is coming to a sudden stop, for example, an image including the word "STOP," an image of a stop sign, etc.

The one or more sensors 154 further can include at least one ambient light sensor. In one example embodiment, the ambient light sensor can detect the ambient light conditions around the vehicle, and if the detected ambient light is above or below a specific threshold value, and the controller 150 may adjust, e.g., increase or decrease the brightness of the projector, based upon the detected light conditions. For example, the controller 150 may increase the brightness in high light conditions to, for example, increase visibility of the projected images, and decrease the brightness in low light conditions to, for example, save power.

The transmitter/receiver 156 can include a RF, IR, Bluetooth, cellular, WiFi transmitter/receiver or other suitable frequency transmitter/receiver to, for example, initiate and maintain communications with a control system of the vehicle or other suitable system, such as, a mobile device, e.g., a mobile phone, tablet, PC, GPS Navigation System (e.g., Garmin®, TomTom®, etc.), etc. and further may allow for the receipt of signals from public or private networks such as a cellular networks, wireless networks, mesh networks, etc. For example, the transmitter/receiver 156 can allow for communications between the controller 150 and a control system of the vehicle such that the controller 150 can control the projection mechanism 28/128 to display images or sequences thereof to generally correspond to one or more executed vehicle operations, e.g., activation of the brakes, turn signals, emergency flashers, etc. The controller 150 additionally, or in the alternative, can have a hard wired connection, e.g., a cord or cable, with the vehicle control system or other components of the vehicle, for example, one or more sensors in communication with the braking system to detect activation thereof.

The transmitter/receiver 156 further can allow for communications between the controller 150 and one or more mobile devices. The mobile device can provide images to the controller 150 for display by the projection mechanism 28/128. The mobile device further can access or run one or more applications that allow for control of the projection mechanism 28/128, for example, to change settings thereof, to select images for display, or to retrieve data collected by the projection mechanism 10/100, etc. Sensing devices, e.g., accelerometers, gyroscopes, proximity sensors, or other components, e.g., GPS units, of the mobile device further can be used to determine vehicle characteristics, such as speed, altitude, accelerations, or location, etc., for the display of one or more images or sequence thereof corresponding to these characteristics.

In one embodiment, the transmitter/receiver 156 and/or the GPS unit 152 can provide information relating to navigation for display as one or more images or a series of images by the projection mechanism 28/128, for example, upcoming turns, relative distances, etc. Such information can be updated and relayed upon travel of the vehicle, and such information can be for the benefit of nearby travelers, for example, travelers that are part of a group traveling along a common route and/or to a common location, for example, a caravan or motorcycle club. The transmitter/receiver 156 and/or the GPS unit 152 can also provide information relating to roadway information, for example, information relating to road construction or roadwork zones, posted speed limits, detours, accidents, stalled vehicles, etc. for display by the projection mechanism 28/128 as one or more images or a series of images. Such information can be provided, for example, by a municipal, county, state, or federal transportation authority, or by a third party, such as an electronic application such as Waze®.

The power source 160 can include any suitable power source, such as one or more batteries, e.g., A, AA, AAA, 6V, 9V alkaline batteries, or a Lithium Ion battery pack, though any suitable the power source can be used, for example, the projection assembly 10/100 can be coupled to a power source on the vehicle, e.g., vehicle battery or can include another suitable power source, such as solar cells, etc. In one example, solar panels or cells can be used to charge an energy storage element such as a battery and/or can be used to directly power components of the projection assembly 10/100. In another example, the projection assembly 10/100 can be configured for wireless charging, for example, induction charging or WiFi charging.

The GPS unit 152 and sensors 154 further can be used to track and log the vehicle's time in motion, distance traveled, etc., for example, for compliance with regulatory or governmental requirements.

Figure 8A:
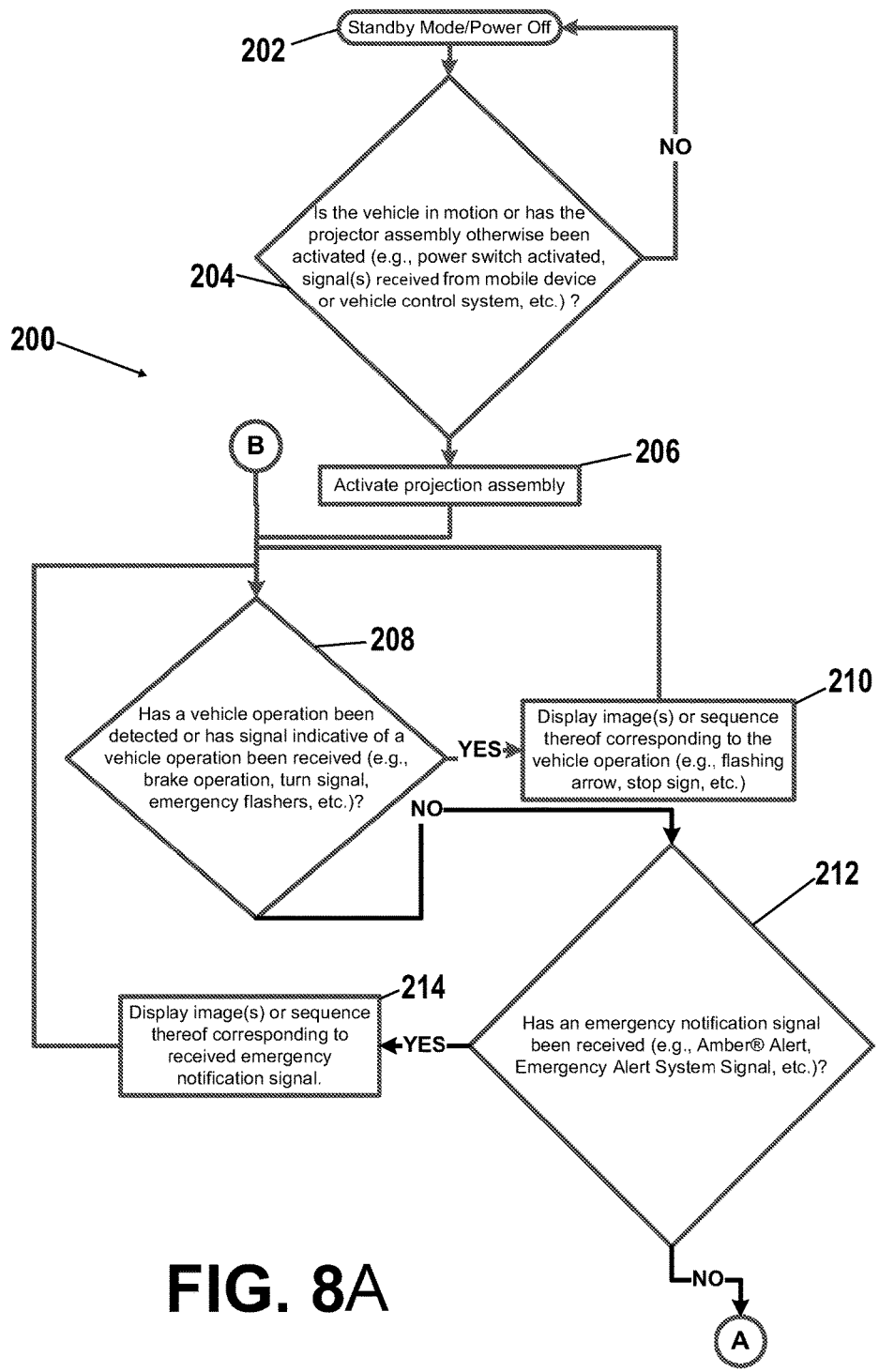
FIGS. 8A and 8B show a flowchart showing exemplary operations of the vehicle projection assembly according to principles of the present disclosure.
Figure 8B:
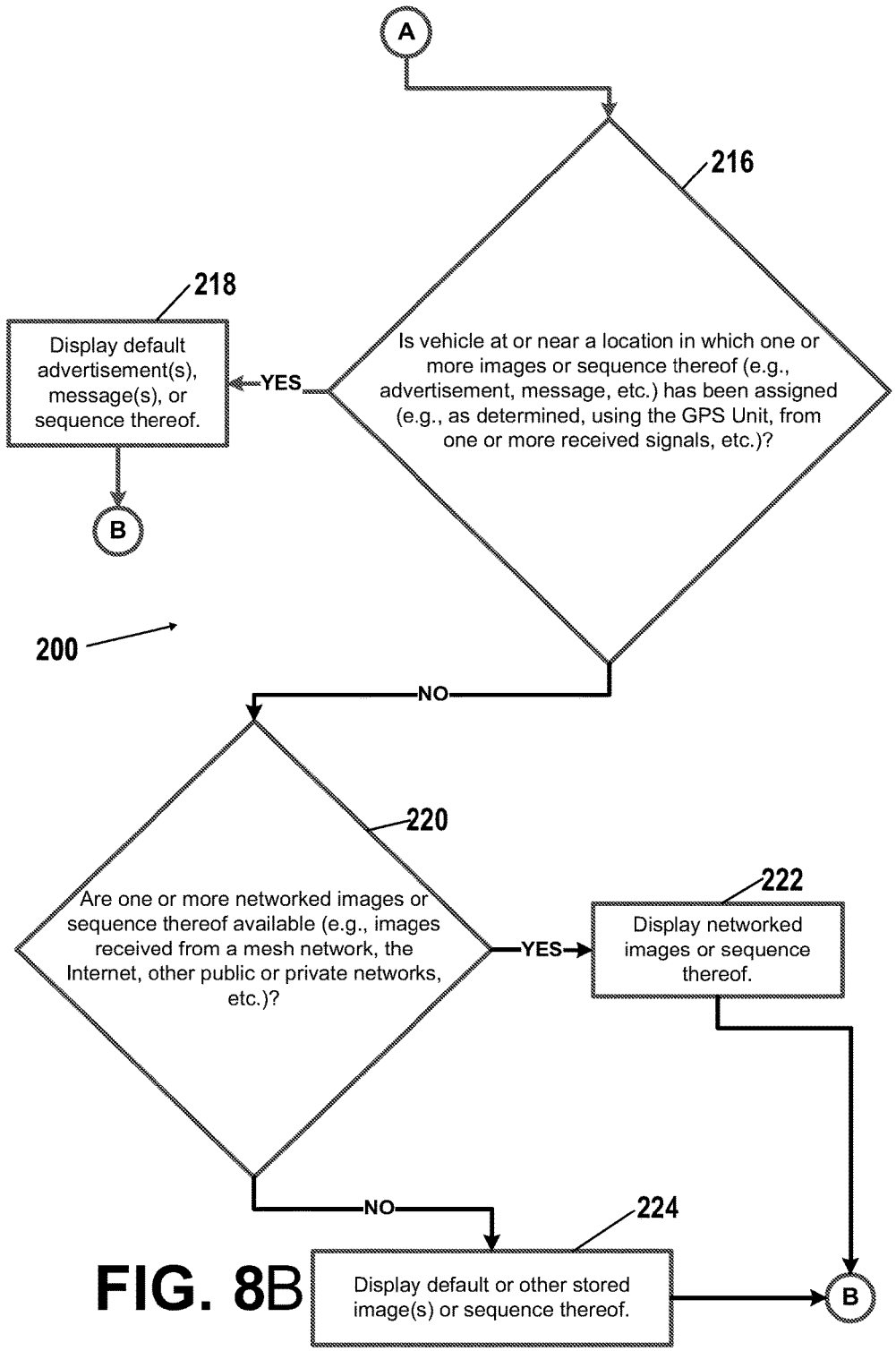

FIGS. 8A and 8B show a flowchart 200 for the operations of the vehicle projection assembly 10/100 according to one example embodiment. As shown in FIG. 8, the projection assembly 10/100 may initially be in a stand-by mode or off condition (Step 202), then at Step 204, it is determined whether the vehicle is in motion or if the projection assembly 10/100 has otherwise been activated, for example, a power switch has been activated and/or signals have been received from a mobile device or the vehicle control system, etc. If the vehicle is in motion, e.g., as determined by the one or more sensing devices 154 (e.g., an accelerometer), or otherwise has been activated, the vehicle projection assembly 10/100 goes from the stand-by mode or the power off mode to an activated mode (Step 206). If the vehicle is not in motion or the vehicle projection assembly has not been activated, the vehicle projection assembly remains in the stand-by or power off mode (i.e., return to Step 202).

Upon activation of the vehicle projection assembly 10/100, a determination can be made as to whether one or more vehicle operations have been detected, e.g., such as whether a signal is received from the vehicle control system or other component of the vehicle that indicates a vehicle operation (Step 208). For example, a vehicle operation can include activation of the brakes, turn signals, the emergency flashers, etc. If a vehicle operation has been detected (at Step 208), the projection assembly 10/100 may display an image or sequence of images that generally corresponds to the detected vehicle operation at Step 210. For example, if it is determined that a turn signal has been activated, the projection mechanism 28/128 may display an image of an arrow or other suitable image indicating in the direction in which the driver intends to turn. The arrow may be a generally static arrow that is projected on the vehicle or rider or the arrow may be a generally static arrow or other animation that flashes/pulses like a turn signal. On the other hand, if the brakes are activated, the image might include a red stop sign, or image including the word "STOP," which may be a generally static image or an animation, video, or pulsing/flashing image. The projection mechanism 28/128 can display one or more other images or series of images without departing from the disclosure.

If a vehicle operation has not been detected (at Step 208), a determination is made as to whether the projection assembly 10/110 or device in communication therewith (e.g., a mobile device) has received an emergency notification signal (at Step 210), for example, an Amber® Alert, a signal from the emergency alert system, or other suitable emergency notification. Such information can include pertinent roadway information, for example, relating to accidents or blockages. If one or more emergency notification signals have been received, the projection assembly 10/100 displays an image or sequence of images generally corresponding to the received emergency notification signal (Step 214). In one embodiment, if an Amber® Alert is received, an image including information related to the Amber® Alert may be displayed by the projection mechanism. For example, information on the missing child, including date of birth, sex, race, other physical descriptors, and/or other relevant information and the image(s) may display information relating to the suspected abductor, such as date of birth, sex, race, associated vehicle information, or other physical descriptors or other suitable/relevant information.

As further shown in FIG. 8A, if no vehicle operation has been detected (at Step 208) and no emergency notification signal has been received (at Step 212), a determination may be made as to whether the vehicle is at or near a location in which one or more images or sequence thereof, for example, advertisements, messages, notifications, etc., have been assigned to be displayed (Step 216). For example, the GPS unit 152 may determine the location of the vehicle and the controller 150 may cross-reference the determined location with one or more images, such as advertisements, messages, etc., assigned to that determined location, e.g., one or more images stored on the storage 158 or received by the transmitter/receiver 156 from a network. As shown in FIG. 8B, if it is determined that the vehicle is at a location in which one or more images such as advertisements, messages, or sequence thereof has been assigned (Step 216), the projection mechanism 28/128 displays the advertisements, messages, or sequence thereof (Step 218). Accordingly, the projection assembly 10/110 can display a series of advertisements, messages, notifications, etc. that can change based upon the vehicle locations, i.e., different advertisements can be displayed at different locations.

In one example, the vehicle can be passing through a first town, city, or municipality, such as Atlanta, Ga., and the transmitter/receiver 156 can receive a signal associated with a local business or organization such that the projection mechanism 28/128 displays advertisements, messages, notifications, etc. associated with the local business or organization. Upon further travel of the vehicle to a second town, city, or other municipality, for example, Birmingham, Ala., the transmitter/receiver 156 can receive a signal associated with a local business organization such that the projection mechanism 28/128 displays advertisements, messages, notifications, etc. associated with this local business or organization. In this regard, the projection assembly 10/110 can be configured to display images or a series of images associated with locations through which the vehicle travels, for example, to provide pertinent images or series of images to passers-by or nearby travelers. The projection assembly 10/110 can also be configured to change an image or series of images based upon a changed location. In one embodiment, such images or series of images can be projected by the projection assembly 10/110 in exchange for compensation by a provider of the content of the images or series of images. Such compensation can be based upon, for example, the particular content of the projected images or series of images, length of time the projected images or series of images are on display, and/or the number of images or series of images displayed.

FIG. 8B further shows that, if a vehicle operation is not detected, an emergency alert notification is not received, and/or the vehicle is not in a location wherein one or more images (advertisements, etc.) are assigned to be displayed, the controller 150 may determine whether one or more network images or sequence thereof are available (Step 220). These images can include images received by the transmitter/receiver from a mesh network, the Internet, and/or other public and private networks, etc. If one or more network images are available, the projection assembly 10/110 may display the network images or sequence thereof (Step 222). If network images are not available, however, the projection assembly may display default or other stored images (e.g., images stored in the storage 158) or sequence thereof (Step 224). The default images may include default images pre-stored onto the storage 158 of the projection assembly 10/110 to be accessed by the controller 150, such as images stored by the manufacturer or pre-selected images stored by an operator of the projection assembly 10/100.

It should be understood that Steps 202 to 224 can be carried out in any suitable sequence and further that any of Steps 202 to 224 can be modified or removed and/or additional steps included, without departing from the scope of the present disclosure.

Figure 9A:
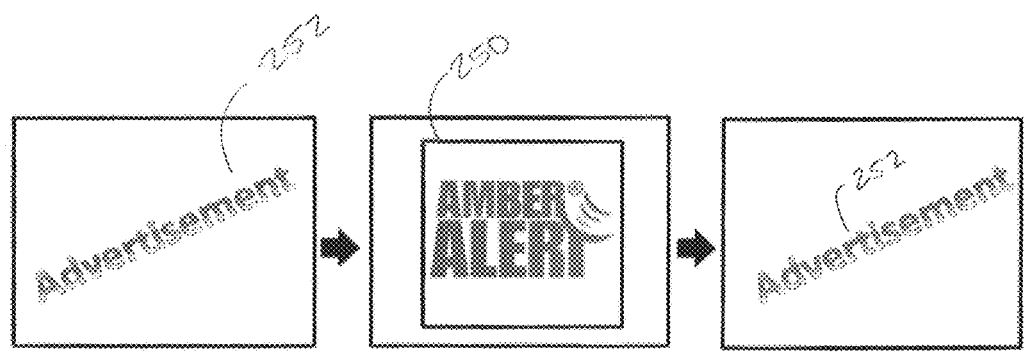
FIGS. 9A-9C show various images and combinations thereof that can be displayed by the projection assembly according to principles of the present disclosure.
Figure 9B:
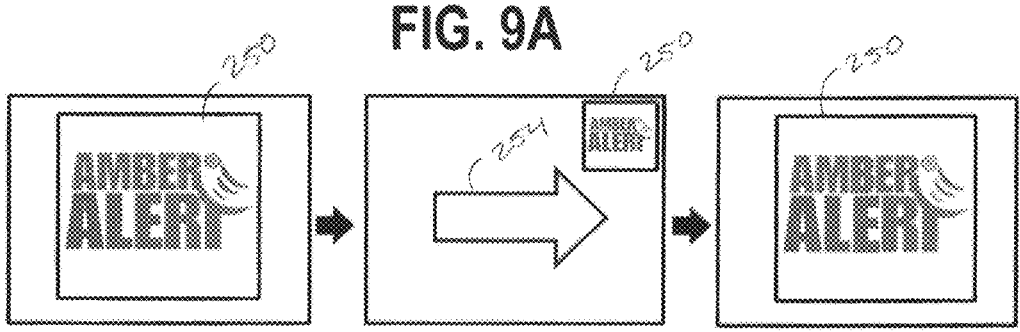
Figure 9C:
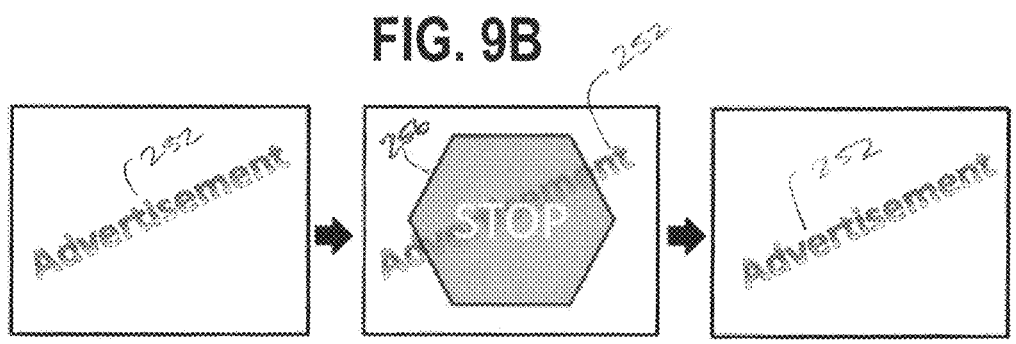

FIGS. 9A-9C show example sequences of images as displayed by the projection assembly 10/110, for example, images displayed based on detected of vehicle operations, received emergency signals, images corresponding to the vehicle location. As shown in FIG. 9A-C, the images can change, and for example, images can replace displayed images (FIG. 9A), multiple images can be shown simultaneously (FIG. 9B), or images can be superimposed onto other images (FIG. 9C) based upon received inputs. In one embodiment, if an emergency notification signal (e.g., an Amber® Alert) is received during the display of an advertisement, an image 250 corresponding to the received emergency notification signal may replace the image 252 relating to the advertisement, for example, for a set time period and then the advertisement can again be displayed (FIG. 9A). Further, if a vehicle operation is detected during the display of an image 250 relating to a received emergency signal notification, an image 254 related to the detected vehicle operation (e.g., an arrow for an activated turn signal) can be displayed simultaneously with the image 250 relating to a received emergency signal notification, with the image 250 becoming less prominent. On the other hand, if a vehicle operation is detected during the display of an image 252 (e.g., an advertisement) relating to a vehicle location, an image 256 related to the detected vehicle operation (e.g., an image of a stop sign for brake activation) can be superposed onto the image 252 (e.g., an advertisement) relating to the vehicle's location.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A projection assembly for a motorcycle, comprising:
    a housing comprising top, bottom, and side portions that at least partially surround and at least partially define a chamber, the housing comprising an opening defined therealong and positioned substantially adjacent to a forward end thereof, the bottom portion of the housing comprises a generally arcuate shape that is complementary to a surface of a rear fender of the motorcycle to facilitate attachment of the projection assembly to the rear fender of the motorcycle;
    a projection mechanism that is at least partially received within the chamber of the housing, the projection mechanism is positioned substantially adjacent to the opening of the housing to allow light generated by the projection mechanism to pass through the opening to project a plurality of images onto a driver or passenger of the motorcycle; and
    a controller at least partially received within the chamber of the housing and in communication with a brake system and a turn signal assembly of the motorcycle, the controller operable to control the projection mechanism to project one or more images of the plurality of images onto the driver or passenger of the motorcycle that correspond to one or more operations of the brake system and the turn signal assembly of the motorcycle, such that when the driver activates a brake of the brake system of the motorcycle, the projection mechanism projects an image including a stop sign onto the driver or passenger of the motorcycle, and when the driver activates a turn signal of the turn signal assembly of the motorcycle, the projection mechanism projects and image including an arrow corresponding to a direction of the turn signal onto the driver or passenger of the motorcycle.

2. The projection assembly of claim 1, further comprising at least one ambient light sensor in communication with the controller, wherein the controller is operable to adjust an intensity of the light projected from the projection mechanism based upon light conditions captured by the ambient light sensor.

3. The projection assembly of claim 1, further comprising a global positioning system (GPS) unit, wherein the controller displays one or more images or sequence thereof based on a location of the motorcycle determined by the GPS unit.

4. The projection assembly of claim 1, further comprising at least one receiver configured to receive emergency notification signals, wherein the controller displays one or more images or sequence thereof based upon received emergency notification signals.

5. A projection assembly for a motorcycle vehicle, comprising:
    a housing that at least partially surrounds and defines a chamber, the housing includes a bottom portion that has an arcuate shape that is least partially complementary to and configured to be coupled to a rear fender of the motorcycle, the housing further includes a slot defined in and positioned along a forward end of the housing;
    a projection mechanism that is at least partially received within the chamber of the housing, the projection mechanism is positioned substantially adjacent to the slot in the housing and is configured to project light through the slot in the housing to generate images or a series of images onto at least a portion of an operator or passenger of the motorcycle;
    a controller in communication with the projection mechanism and with a brake system and a turn signal assembly of the motorcycle, the controller is at least partially received within the chamber of the housing, and operable to control the projection mechanism to project one or more images or one or more series of images onto the operator or passenger of the motorcycle that correspond to one or more operations of the brake system and the turn signal assembly of the motorcycle, wherein when the motorcycle operator activates a brake of the brake system of the motorcycle, the projection mechanism projects an image including a stop sign onto the driver or passenger of the motorcycle, and when the motorcycle operator activates a turn signal of the turn signal assembly of the motorcycle, the projection mechanism projects and image including an arrow corresponding to a direction of the turn signal onto the driver or passenger of the motorcycle;
    an ambient light sensor in communication with the controller, the ambient light sensor captures one or more light conditions and transmits information related to the one or more light conditions to the controller, the controller is operable to automatically adjust an intensity of the light from the projection mechanism based upon the information related to the one or more light conditions captured by the ambient light sensor; and one or more of a global positioning system (GPS) unit, a sensor, and a transmitter or receiver in communication with the controller such that the projection mechanism changes a projection of first images or a first series of images to a projection of second images or a second series of images upon receiving a signal from the one or more of the GPS unit, the sensor, and the receiver, the second images or the second series of images are different than the first images or the first series of images.

6. The projection assembly of claim 5, wherein the sensor is an accelerometer, an ambient light sensor, a pressure sensor, a proximity sensor, a camera, an impact sensor, a radar sensor, a LiDar sensor, a temperature sensor, or a humidity sensor.

7. The projection assembly of claim 5, wherein the received signal is a location.

8. The projection assembly of claim 5, wherein the received signal is an emergency notification signal.

9. The projection assembly of claim 5, wherein the received signal is a commercial advertisement associated with a location proximate the motorcycle.

10. A projection assembly for a motorcycle, comprising:
a housing including top, bottom, rear, and side portions that at least partially define a chamber, the housing having an opening defined therealong and positioned substantially adjacent to a forward end thereof, the bottom portion of the housing includes a generally arcuate shape that is complementary to a surface of a rear fender of the motorcycle to facilitate attachment of the projection assembly to the rear fender of the motorcycle, the rear portion of the housing includes an at least partially translucent section;

a projection mechanism that is received within the chamber of the housing, the projection mechanism is positioned substantially adjacent to the opening of the housing to allow light generated by the projection mechanism to pass through the opening to project a plurality of images onto a driver or passenger of the motorcycle;

a controller that is received within the chamber of the housing and in communication with a brake system and a turn signal assembly of the motorcycle, the controller operable to control the projection mechanism to project one or more images of the plurality of images onto the driver or passenger of the motorcycle that correspond to one or more operations of the brake system and the turn signal assembly of the motorcycle, such that when the driver activates a brake of the brake system of the motorcycle, the projection mechanism projects an image including a stop sign onto the driver or passenger of the motorcycle, and when the driver activates a turn signal of the turn signal assembly of the motorcycle, the projection mechanism projects and image including an arrow corresponding to a direction of the turn signal onto the driver or passenger of the motorcycle;

an ambient light sensor received along the housing and in communication with the controller, the ambient light sensor captures one or more light conditions and transmits information related to the one or more light conditions to the controller, the controller is operable to automatically adjust an intensity of the light from the projection mechanism based upon the information related to the one or more light conditions captured by the ambient light sensor; and at least one light source received in a compartment defined within the chamber of the housing and in communication with the brake system, when the operator activates a brake of the brake system, the at least one light source activates to illuminate the translucent section of the rear portion of the housing.

* * * * *